United States Patent
Xu et al.

(10) Patent No.: US 11,774,290 B2
(45) Date of Patent: Oct. 3, 2023

(54) COMPENSATE SURFACE GLOSS IN SPECTRUM RECOVERY

(71) Applicant: DATACOLOR INC., Lawrenceville, NJ (US)

(72) Inventors: Zhiling Xu, Princeton Junction, NJ (US); Bill Binder, Stockton, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 506 days.

(21) Appl. No.: 16/895,889

(22) Filed: Jun. 8, 2020

(65) Prior Publication Data
US 2021/0381896 A1 Dec. 9, 2021

(51) Int. Cl.
*G01J 3/46* (2006.01)
*G01N 21/55* (2014.01)
*G06F 17/16* (2006.01)
*G01J 1/44* (2006.01)
*G01J 3/52* (2006.01)
*G01J 3/50* (2006.01)

(52) U.S. Cl.
CPC ............ *G01J 3/462* (2013.01); *G01J 3/524* (2013.01); *G01N 21/55* (2013.01); *G06F 17/16* (2013.01); *G01J 3/501* (2013.01); *G01J 2001/444* (2013.01); *G01J 2003/467* (2013.01)

(58) Field of Classification Search
CPC ............ G01J 3/462; G01J 2001/444; G01J 2003/467; G01N 21/55; G06F 17/16
See application file for complete search history.

(56) References Cited

U.S. PATENT DOCUMENTS

| | | | | |
|---|---|---|---|---|
| 6,188,471 B1* | 2/2001 | Jung | ...................... | G01N 21/57 |
| | | | | 356/417 |
| 9,952,102 B1* | 4/2018 | Xu | ........................ | G01J 3/0297 |
| 10,444,074 B1 | 10/2019 | Xu | | |
| 2013/0182256 A1* | 7/2013 | Kubota | ..................... | G01J 3/42 |
| | | | | 356/402 |

OTHER PUBLICATIONS

Cooksey et. al., "Establishment and application of the 0/45 reflectance factor scale over the shortwave infrared", Applied Optics / vol. 54, No. 10 / Apr. 1, 2015 (Year: 2015).*
Datacolor, "Understanding Datacolor Gloss Compensation"; https://knowledgebase.datacolor.com/admin/attachments/gloss_compensation_dci.pdf, first indexed by Google before Sep. 2012. (Year: 2012).*

* cited by examiner

*Primary Examiner* — Regis J Betsch
(74) *Attorney, Agent, or Firm* — LEASON ELLIS LLP

(57) ABSTRACT

In accordance with one or more implementations of the apparatus, system and methods described, a sample measurement device is provided that is configured to measure the color of a sample. The sample measurement device includes at least one light source configured to illuminate the sample; at least one light sensor configured to output a signal in response to light emitted by light source and reflected off the sample being received by at least a portion of the light sensor; and a processor configured to receive the signal and calculate a color value for the sample, the processor configured to calculate the color value by at least adjusting the signal using a calibration factor.

18 Claims, 9 Drawing Sheets

COMPENSATE SURFACE GLOSS IN SPECTRUM RECOVERY

FIELD OF THE INVENTION

The present invention is directed to measurement devices and approaches for improving full spectrum information recovery of samples with different gloss characteristics.

BACKGROUND OF THE INVENTION

Usually, a color measuring device based on matrix transformation is calibrated (or trained) with one set of known color samples. These training color samples usually have similar surface gloss properties. However, when such a device is used to measure other samples with different surface gloss properties, the result may be significantly impacted by the surface gloss, depending on the geometry of the trained color measuring device. Particularly, if a measurement device is required to match the colors measured with other instruments having different geometry, the resulting spectrum recover values can differ significantly from one another.

Thus, what is needed in the art is a solution that allows for the compensation of the surface gloss of a sample and output the proper spectral reflectances.

SUMMARY OF THE INVENTION

In accordance with one or more implementations of the apparatus, system and methods described, a sample measurement device is provided that is configured to measure the color of a sample. The sample measurement device includes at least one light source configured to illuminate the sample; at least one light sensor configured to output a signal in response to light emitted by light source and incident upon the sample being received by at least a portion of the light sensor; and a processor configured to receive the signal and calculate a color value for the sample, the processor configured to calculate the color value by at least adjusting the signal using a calibration factor.

In a further implementation, the orientation of the at least one light source and the at least one light sensor is a 45/0 and the calibration factor is derived using measurements of a color measurement device having a measurement geometry different than 45/0.

DETAILED DESCRIPTION OF CERTAIN EMBODIMENTS OF THE INVENTION

Figure 1:
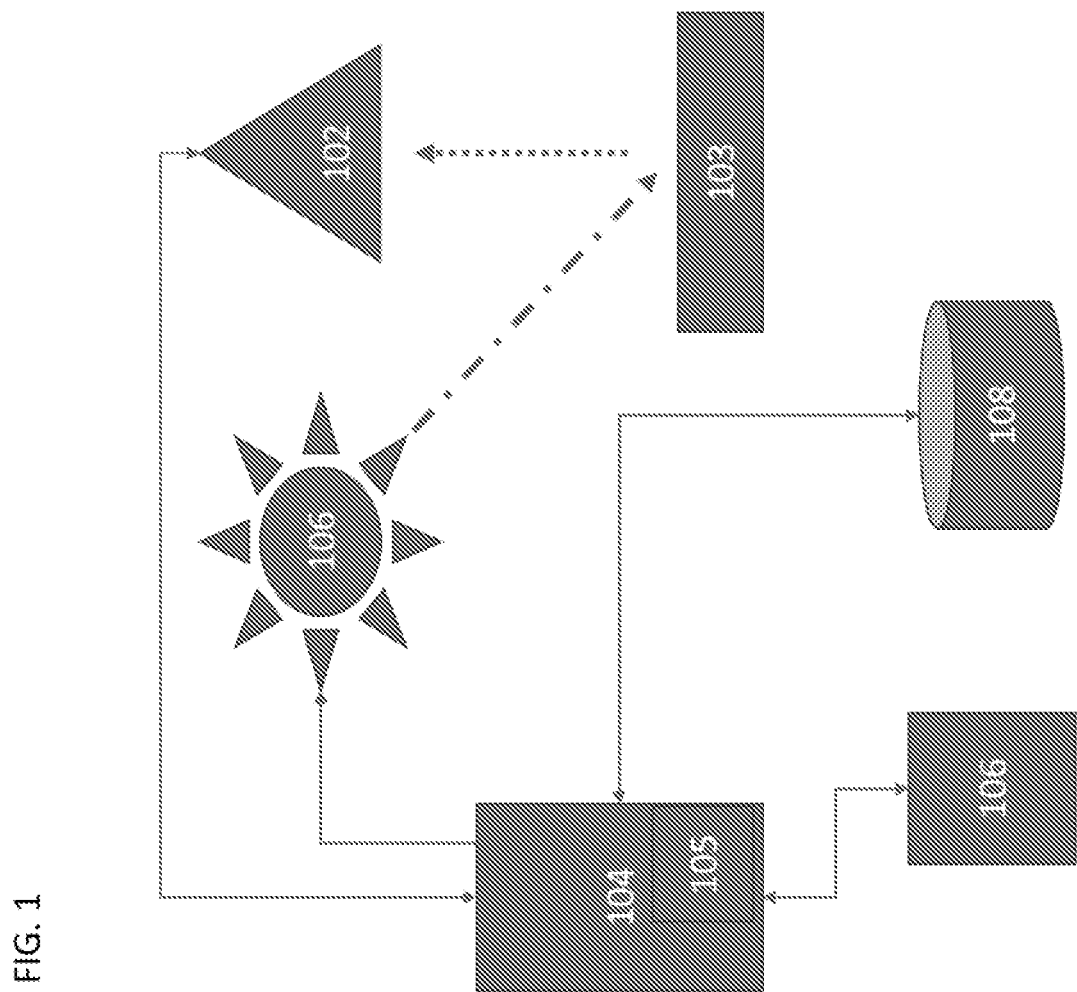
FIG. 1 is a schematic illustration detailing particular elements of the described spectrum recovery apparatus.

By way of overview and introduction, a process for compensating the gloss of samples in a spectrum recovery of the samples is provided. In one particular arrangement, the gloss properties of different samples are compensated for in a spectrum recovery process by adjusting the raw counts of the sensor in the color measurement device using a transformation matrix. This process allows a spectrum recovery device to measure color samples with different gloss and better match the result of the same samples measured with another instrument having different measurement geometry.

By way of overview, the described process is implemented to compensate the gloss of a sample in order to improve the color accuracy of a color measurement device that measures reflectances using matrix-transformation method. A calibration matrix is used to adjust the measured raw signals. The calibration matrix, in one arrangement is derived by obtaining color measurements of a training set of calibration color samples. These calibration color samples have similar surface gloss properties and they may be different from the surface gloss properties of the sample to be measured. The raw counts of the multi-channel sensor in the color measurement device described are collected by measuring each of the calibration color samples, and then adjusted relative to the raw counts of a white calibration standard. The amount of adjustment is determined by the color samples the device is targeted to measure. These adjusted raw counts are then used to generate the transformation matrix. After the transformation matrix is generated, the color measurement device described herein can be used to measure the targeted type of samples directly.

By way of further overview, where the spectral reflectance of a sample in the full visible wavelength range is known, the color can be calculated under any given illumination and any given standard observer. Therefore, full-spectrum reflectance is an important property of a sample in the field of color measurement. Usually, the full spectral reflectances can be measured using a spectrophotometer that has a narrow channel at each of the interested wavelengths. However, for color measurement devices that have a relatively small number of channels (usually less than 20), the full-spectrum reflectance of a sample can be recovered using these wavelength channels. For example, with the 6-channel AMS spectral sensor AS7262, the full spectrum of reflectances in the range of 400~700 nm with 10 nm intervals can be recovered using calibration factors and training data sets. Particularly, a set of calibration colors are needed to train the color measurement device to obtain a transformation matrix. Further discussion of the training process can be found in US patent "Spectrum Recovery in a Sample" (U.S. Ser. No. 10/444,074B1) granted to Z. Xu et. al. To achieve better performance, the set of calibration colors are selected to have similar surface gloss property. After training, if the spectrum recovery measurement device is used to measure a sample with similar surface gloss as the calibration color samples, the result is generally accurate. However, the spectrum recovery device may be used to measure a sample with different gloss from the training samples, and the result may be required to match the result from a different instrument with different geometry. In such a case, the gloss may cause a significant difference between measurement results.

For example, an instrument with d/8 specular component included (SCI) geometry can measure colors of various surface properties properly without much impact from the surface gloss of the sample. For this reason, SCI instruments are used in color matching of various samples including paint, textile, plastic, etc. However, since SCI instruments treat different surfaces equally, they lose the subtleties of the surface, and their color measurement results are different from human visual assessment. On the other hand, an instrument with 45/0 geometry measures color by removing the specular components. As such, the measurements of 45/0 devices are impacted by the surface gloss of the sample measured. Since 45/0 measurement geometries give color measurement results closer to visual assessment, they are also widely used.

Figure 6:
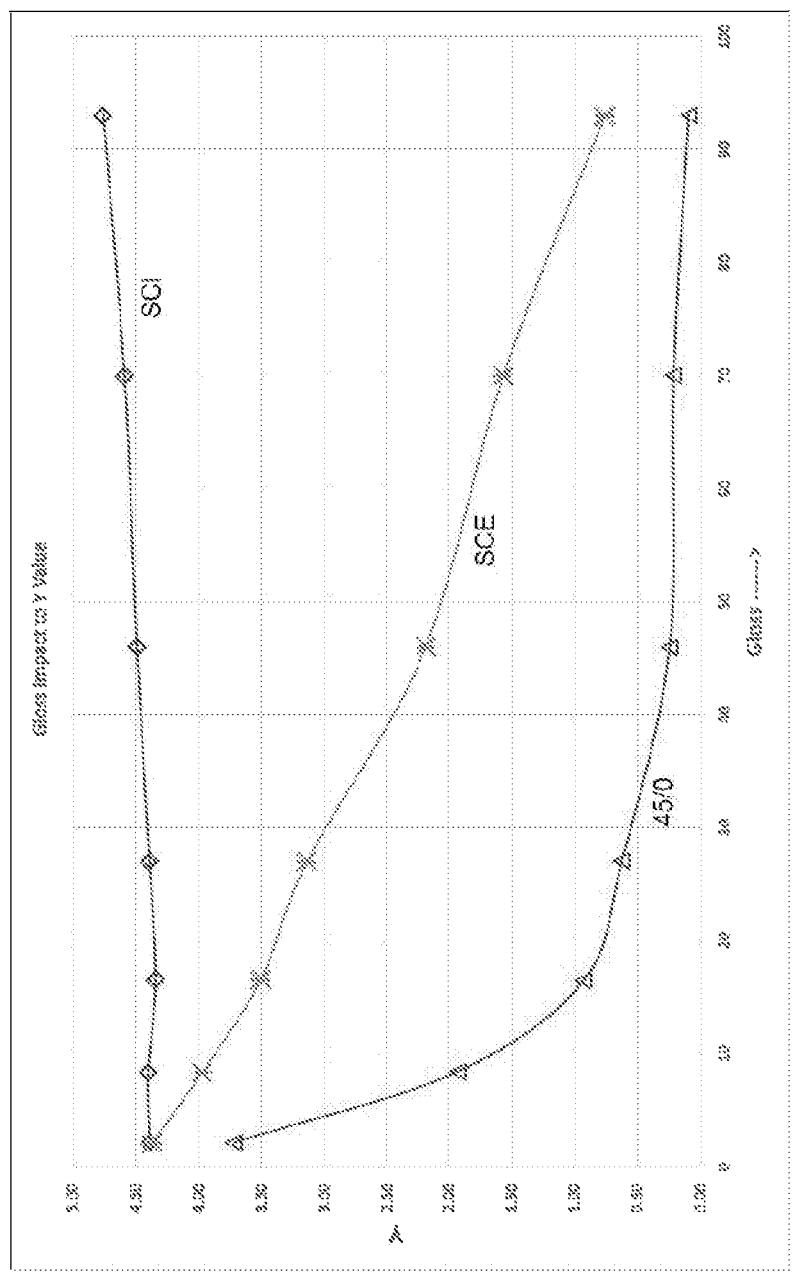
FIG. 6 is a plot detailing data measurement in connection with the described improved spectrum recovery process.

It will be appreciated that the relation of color Y-value and surface gloss when measuring a group of samples of the same color but different gloss using different geometry instruments can be determined. As shown in FIG. 6, the relation of color Y-value and surface gloss when measuring a group of samples of the same black color but different gloss using different geometry instruments is provided. As can be seen, the SCI results stay similar for samples with different gloss, however, the other geometries, particularly 45/0, are sensitive to the surface gloss of the sample measured. Given these differences, it's hard to compare or match the measurement result obtained from different instruments. Furthermore, with the SCI instrument, when two samples of the same color but different surface gloss are measured, the results are quite close. However, the result measured with a 45/0 device can be quite different. When a 45/0 device is used to measure a high gloss sample, the specular component cannot reach the detector; therefore the measured raw counts tend to be lower. On the other hand, when it is used to measure a low gloss sample, some of the surface reflection can reach the detector, and thus the measured raw counts tend to be higher.

The described approaches compensate for these existing problems in the art using novel, non-routine, and unconventional approaches. The described apparatus and processed described herein improve upon the technology of spectrum recovery in sample measurements and allow for a single device having 45/0 measurement geometry recover the same spectrum as a device using a d/8 measurement geometry. The results are improved accuracy in color measurement and permit for more robust measurement configurations to be implemented that are not constrained to one or more pre-set geometries that provide higher accuracy at other performant costs.

Turning now to FIG. 1, an illustrative example of the described spectrum recovery apparatus is provided. FIG. 1 details several components that are utilized to implement the spectrum recovery apparatus, including a light measurement component 102 configured to obtain measurements of light reflected off of a sample 103. In the provided figure, the measurement geometry is in 45/0 orientation; however, other measurement geometries are understood and contemplated.

As shown in FIG. 1, the sample 103 is illuminated by a light source 106. In one or more implementations, the light source 106 is an LED, OLED, LCD or other light emitting device. In further implementations, the light source 106 is a halogen, incandescent, mercury or other light source that is configured to illuminate the sample in visible light. In an implementation where the light source 106 is a broad band LED configured to provide uniform, or near uniform, light intensity across the visible light spectrum. In another arrangement, the light source 106 is formed of a collection of separately addressable lighting elements. For example, in one or more implementations, the separately addressable lighting elements are narrow band illuminations such that each lighting element is configured to produce a narrow band of illumination about a given wavelength or wavelength range. In one or more further implementations, each of the light sources are configured to be activated in response to one or more control signals or flags from a lighting controller.

In a particular implementation, the light source or light sources are movable or adjustable to provide different illumination geometries based on user need. For example, one or more lighting elements are positioned to provide a 45/0 illumination geometry. In other arrangements, the lighting elements are positioned to other illumination geometries. In one or more particular implementations, multiple lighting elements are provided such that the desired geometry can be selected and used in connection with the spectrum recovery process described herein.

Upon activation of one or more light sources 106, the light (as shown in dashed lines) illuminates a sample 103. In one or more implementations, the sample 103 is a color swatch, fan deck, color sample, product, item or object. For example, the sample 103 is an object having high gloss properties. In another arrangement, the sample 103 is an object having low gloss properties. In another implementation, the sample 103 is any object where the color values and/or the gloss properties of the object is unknown or in need of clarification. Light that has been reflected off the sample 103 (shown in dotted lines) is then received by one or more light sensing elements of a light sensor of the light measurement device 102. For example, the light that has been reflected off the sample 103 strikes one or more photoelectric cells and causes a signal to be produced corresponding to the wavelength, intensity or other property of the light received.

In one implementation the light measurement device 102 is a spectrophotometer or colorimeter. In a further implementation, the light measurement device 102 is a collection or array of photometers, light sensing elements, or other similar devices. In a further implementation, the color measurement device is one or more cameras or image acquisition devices such as CMOS (Complementary Metal Oxide Semiconductor), CCD (charged coupled device) or other color measurement devices. Such sensors can include data acquisition devices and associated hardware, firmware and software that is used to generate color values for a given sample. In one or more implementations, both a primary light sensor and a reference channel sensor are used to capture light measurements. In a further particular implementation, the light measurement device 102 is used to generate spectrum color values of the sample 103.

In a further arrangement, multiple sensors can be oriented within a housing or support structure that includes at least the light source 106 and the light measurement device 102. In this configuration, different sensors and light sources are oriented so as to provide different measurement geometries known to those possessing an ordinary level of skill in the requisite art.

In yet a further implementation, the light measurement device 102 is configured to have a plurality of channels for measuring different wavelengths of light. In one implementation the light measurement device 102 is configured to measure light across the visible wavelength spectrum. For example, the light measurement device uses 31 measurement channels to measure the light that interacts with the light measurement device. Here, each of the 31 channels measures a different wavelength range. In other implementations, the light measurement device 102 has less than 31 channels. For instance, the light measurement device has 8 or 6 measurement channels for measuring the visible wavelength spectrum.

The light measurement device 102, in accordance with one embodiment, is a stand-alone device that is configured to one or more components, interfaces or connections to one more processors, networks, or storage devices. In such an arrangement, the color measurement device 102 is configured to communicate with the associated processors, networks, and storage devices using one or more USB, FIREWIRE, Wi-Fi, GSM, Ethernet, Bluetooth, and other wired or wireless communication technologies suitable for the transmission color, image, spectral, or other relevant data and or metadata. In an alternative arrangement, the color measurement device 102 is a component of a smartphone, tablet, cell phone, workstation, testing bench, or other computing apparatus.

The measurements obtained by the color measurement device 102 are passed directly or indirectly to a computer or processor 104 for evaluation and/or further processing. The processor 104 is configured by one or more modules stored in memory 105 to derive spectrum measurements using stored data, raw counts, coefficients or other values. In an alternative configuration, the processor 104 is able to access from the database 108 one or more coefficients for application to the measurements obtained by the color measurement device 102 in order to provide updated or corrected color measurements to a database 108 or a user interface device 106. In one implementation the coefficients used to convert the measured color values to the output color values are stored as a dataset in the database 108.

With further reference to FIG. 1, the processor 104 is a computing device, such as a commercially available microprocessor, processing cluster, integrated circuit, computer on chip or other data processing device. In one or more configurations, the processor is one or more components of a cellphone, smartphone, notebook or desktop computer configured to directly, or through a communication linkage, receive color measurement data captured by the color measurement device 102. The processor 104 is configured with code executing therein to access various peripheral devices and network interfaces. For instance, the processor 104 is configured to communicate over the Internet with one or more remote servers, computers, peripherals or other hardware using standard or custom communication protocols and settings (e.g., TCP/IP, etc.). The processor 104 comprises one or more of a collection of micro-computing elements, computer-on-chip, home entertainment consoles, media players, set-top boxes, prototyping devices or "hobby" computing elements. The processor 104 can comprise a single processor, multiple discrete processors, a multi-core processor, or other type of processor(s) known to those of skill in the art, depending on the particular embodiment.

In one configuration, the processor 104 is a portable computing device such as an Apple iPad/iPhone® or Android® device or other commercially available mobile electronic device executing a commercially available or custom operating system, e.g., MICROSOFT WINDOWS, APPLE OSX, UNIX or Linux based operating system implementations. In other embodiments, the processor 104 is, or includes, custom or non-standard hardware, firmware or software configurations.

In one or more embodiments, the processor 104 is directly or indirectly connected to one or more memory storage devices (memories) to form a microcontroller structure. The memory is a persistent or non-persistent storage device (such as memory 105) that is operative to store the operating system in addition to one or more of software modules 107. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal. The computer memories may also comprise secondary computer memory, such as magnetic or optical disk drives or flash memory, that provide long term storage of data in a manner similar to the persistent memory device 105. In one or more embodiments, the memory 105 of the processor 104 provides for storage of application programs or modules and data files when needed.

As shown, memory 105 and persistent storage 108 are examples of computer-readable tangible storage devices. A storage device is any piece of hardware that is capable of storing information, such as, data, program code in functional form, and/or other suitable information on a temporary basis and/or permanent basis. In one or more embodiments, memory 105 includes random access memory (RAM). RAM may be used to store data in accordance with the present invention. In general, memory can include any suitable volatile or non-volatile computer-readable storage device. Software and data are stored in persistent storage 108 for access and/or execution by processors 104 via one or more memories of memory 105.

In a particular embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage devices capable of storing program instructions or digital information.

The database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art.

The media used by persistent storage 108 may also be removable. For example, a removable hard drive may be used for persistent storage 108. Other examples include optical and magnetic disks, thumb drives, and smart cards that are inserted into a drive for transfer onto another computer-readable storage medium that is also part of persistent storage 108.

In one or more implementations, the processor 104 includes one or more communications or network interface units. These units provide for the ability to transfer data obtained from the light measurement device 102 to one or more remote devices 106. In one or more implementations, the communications unit may provide appropriate interfaces to the Internet or other suitable data communications network to connect to one or more servers, resources, API hosts, or computers. In these examples, communications unit may include one or more network interface cards allowing for Bluetooth, ZigBee, serial, ethernet, or other wired or wireless communication protocols. In one or more implementations, the communication unit allows for data processed by the processor 104 to exchange data in real-time or near real-time with a user interface device 106 or databases 108.

In one implementation, the user interface device 106 is a screen, monitor, display, LED, LCD or OLED panel, augmented or virtual reality interface or an electronic ink-based display device that is integrated to the spectrum measurement device described herein. In one or more implementations, the user interface device 106, the processor 104, the lighting element 106 and the light measurement device 102 are incorporated into a single housing. For example, a portable measurement device can incorporate elements 102-106 into a single form factor.

In an alternative implementation, the user interface device 104 is a remote computer that can receive, and display data sent by the processor 104. For example, measurements and data processed by the processor 104 is transmitted to the remote computing device 106 and displayed on a display device that is associated with the remote computing device. By way of non-limiting implementation, the remote computing device 106 is a portable computer (such as a mobile telephone, portable computer and other devices) that is configured to receive data from the processor and display that data on a screen incorporated into such a remote computing device.

Those possessing an ordinary level of skill in the requisite art will appreciate that additional features, such as power supplies, power sources, power management circuitry, control interfaces, relays, interfaces, and/or other elements used to supply power and interconnect electronic components and control activations are appreciated and understood to be incorporated.

Figure 2:
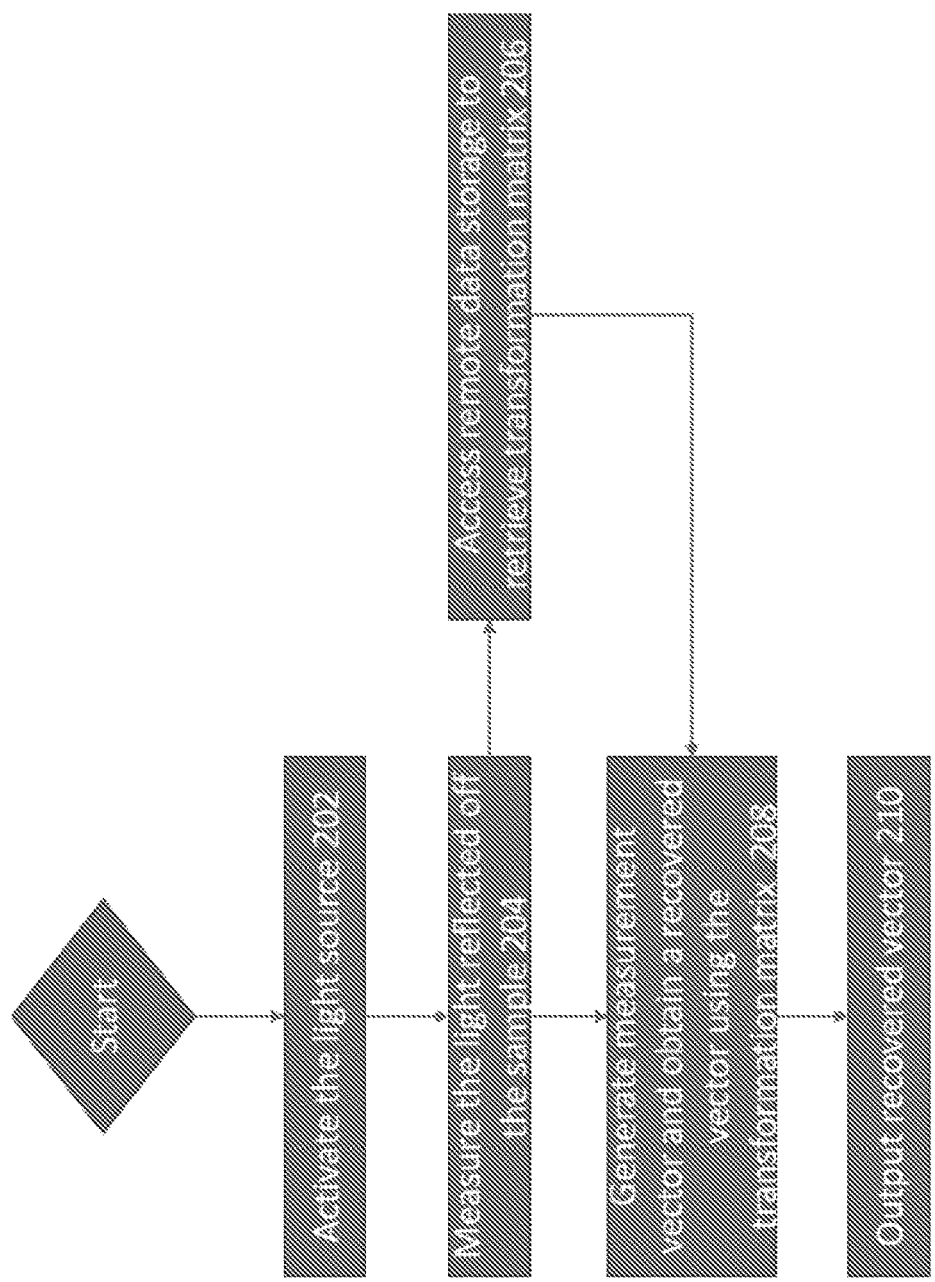
FIG. 2 is a flow diagram detailing particular operation steps in an improved spectrum recovery process.

Turning now to FIG. 2, the light measurement device 102, the light source 106 and the processor 104 cooperate with one another to evaluate the spectral properties of the sample under analysis. For example, the processor 104 is configured by a collection of modules operative to cause the processor 104 to activate the light sources 106, receive and process the signals generated by the light measurement device 102, and output those measurements to a user interface device. As described in further detail herein, the process of evaluating the spectral properties of a sample 103 can be implemented as a collection of software modules that configure the processor to carry out the various steps described. In a further implementation, the hardware components described herein can be provided as a collection of discrete components that communicate with one another wirelessly. For example, the light source and light measurement devices are integrated into an enclosure that is remote from the one or more processors. In this configuration, data is exchanged wirelessly between the enclosure (such as via Bluetooth) and the processor.

As shown in step 202 of the flow diagram of FIG. 2, a control or initiation signal is sent from the processor 104 to the light source 106. In one implementation, the processor 104 includes an activation module 502 that is operative to configure the processor 104 to provide a control signal to the light source 106 or light sources such that the sample 103 is illuminated by the light source. In one arrangement, the signal or flag generated includes one or more instructions to the light sources 106 such that the measurement geometry between the lighting element and the light measurement device is in 45/0 orientation. For example, where there are multiple light sources distributed at different geometries from the light measurement device, the activation module 502 instructs only those light sources 106 to activate. In one or more implementations, the activation step 202 is initiated by a user selecting a particular configuration of lighting options presented on the user interface device 106.

In the foregoing implementation, the measurement geometry used to measure the reflectance properties of the sample 103 is 45/0. However, those possessing an ordinary level of skill in the requisite art will appreciate that alternative orientations are available given the disclosure provided herein. It will be further appreciated by those possessing an ordinary level of skill in the art that when measurement geometries having a 45/0 orientation are used to measure a sample having high gloss properties, (such as sample 103) the specular component of the light reflected off of the sample 103 cannot reach the sensor elements of the light measurement device 102. As a result, the raw counts measured by the light measurement device will be lower than the actual measurement values. On the other hand, when the 45/0 measurement geometry is used to measure a low gloss sample, a portion of the surface reflection can reach the light measurement device, thus leading to artificially high measurement values.

To compensate the difference caused by gloss properties of the sample 103, the measurement process described herein includes a measurement step, as shown in step 204 of FIG. 2. The measurement step 204, includes in one implementation having a processor that is operative to receive the signals generated by the light measurement in response to receiving light that has been reflected off the surface of the sample. For example, a measurement module 504 configures the processor 104 to receive data output by the light measurement device 102. In one arrangement, the processor 104 is configured by the measurement module 504 to receive direct analog signals from the light measurement device 102. Alternatively, where the light measurement device is configured to output digital values, the processor 104 is configured by the measurement module 504 to receive a data stream in the form of a digital signal, data values, data stream, binary string or other data object suitable to transmit the measurement values obtained by the light measurement device 102.

In one or more implementations, the measurement values obtained from the light measurement device 102 by the processor 104 are provided to the user interface device 106 for review and analysis by a user. However, as noted, direct measurements by a measurement apparatus using a 45/0 measurement geometry can result in undercounting or overcounting light reflected from the surface and generating incorrect color measurements for the sample.

Thus, in order to correct the variance of measurement values introduced using the 45/0 measurement geometry, the measurement values obtained in step 204 can be adjusted to more accurately reflect the true spectrum properties of the sample 103. In step 206, a value corresponding to a portion of a theoretically calculated specular component from a high gloss measurement is added to the measurement values obtained in step 204. Such a modification of the theoretically calculated specular component can be used to simulate the measurement of a low gloss sample.

As shown in step 208, the raw measurement result obtained in step 204 for sample 103 can be represented by vector T:

$$T=(t_1 \ldots t_n, 1), \quad (1)$$

where $t_n$ is the sensor raw counts of the sample 103 on the $n^{th}$ channel obtained from the light measurement device 102. In the provided implementation, a value, such as constant 1 is added at the end of the vector. The measurement vector T is used to then generate a recovered vector $R_{convert}$ using a transformation matrix M according to:

$$R_{convert}=(v_1 \ldots v_{31})=T*M, \quad (2)$$

where $v_p$ is the recovered reflectance of the sample at wavelength p. For example, a transformation module 508 configures the processor 104 to convert the data received from the measurement device 102 into a vector $R_{convert}$. Here, the transformation module 508 includes one or more submodules that configure the processor 104 to access each of the measurement channels of data obtained from the measurement device 102 and perform suitable operations to convert this data into a matrix. One or more further submodules of the transformation module 508 configures the processor 104 to perform a matrix multiplication operation on the matrices T and M.

It will be appreciated that in the foregoing example, p is chosen to be 31, representing wavelengths from 400 nm to 700 nm at 10 nm intervals.

In one or more implementations, the transformation matrix M is stored in the local memory of the processor 104 and is accessible for use in the transformation of step 208. However, in one or more alternative configurations, transformation matrix M is stored in a local or remote data storage location that requires retrieval by the processor 104 prior to use, as in step 206. For example, the processor 104 is configured by an access module 506 to the transformation matrix M from a remote data storage device (such as database 108). Once retrieved, the transformation matrix M can be used in the process provided in step 208 in order to obtain vector $R_{convert}$.

As shown in step 210, once the vector $R_{convert}$ has been obtained, it can be provided to a user via a remote user interface 106. In one implementation, the processor 104 is configured by an output module 310 to output the $R_{convert}$ value to a display associated with the measurement apparatus. In another implementation, the output module 510 configures the processor 104 to provide the transformed value and the original raw measurements to a display. In another implementation, the output module 510 configures the processor 104 to provide the transformed value to a remote computing device (such as a smartphone configured execute software necessary to receive data from the measurement apparatus). In another implementation, the output module 510 configures the processor 104 to provide the transformed value and any other additional data used to generate $R_{convert}$ to a remote storage device, such as database 108, for later retrieval or use.

As shown in step 206, the transformation matrix M can be obtained from a remote data store, such as a database 108. In an alternative implementation, where transformation matrix M has not been previously calculated, the value for M can be derived.

Figure 3:
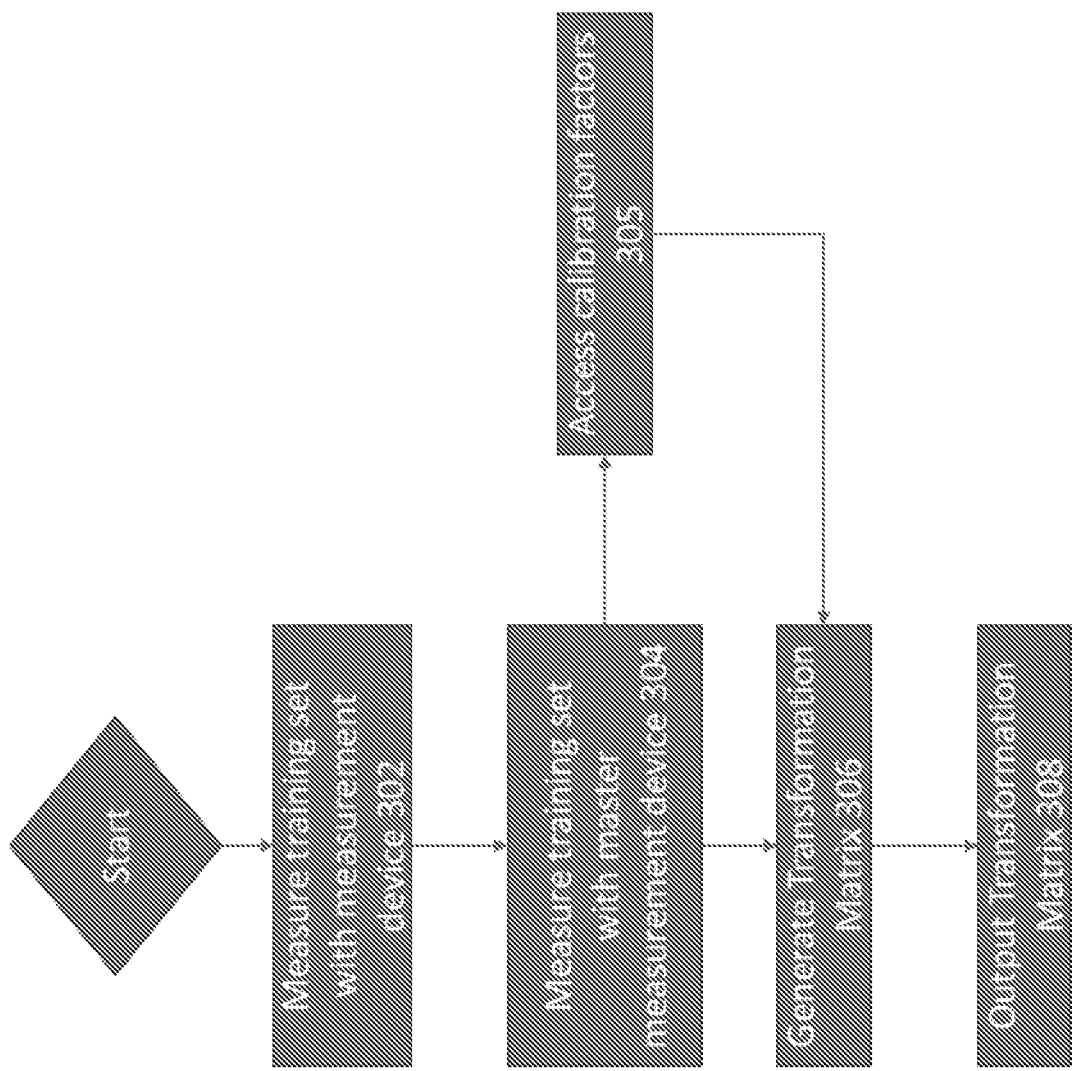
FIG. 3 is a flow diagram detailing particular steps to calibrate an improved spectrum recovery process.

The calibration process provided in FIG. 3 can be used to obtain the transformation matrix M. As shown in FIG. 3, the transformation matrix M can be derived from prior measurements using the spectrum recovery apparatus described herein and one or more additional measurement devices. As shown in step 302, a set of training samples are measured using the spectrum recovery apparatus described in FIG. 1. Here, the color measurement apparatus is used to obtain from a collection of m samples, a raw-data matrix S when illuminated:

$$S = \begin{pmatrix} s_{1,1} & \cdots & s_{1,n} & 1 \\ \vdots & \ddots & \vdots & \vdots \\ s_{m,1} & \cdots & s_{m,n} & 1 \end{pmatrix}, \quad (3)$$

where $s_{m,n}$ is the sensor raw counts of the $m^{th}$ sample on the $n^{th}$ channel. A column of constant 1 is added at the end of the raw-data matrix as an offset. Here, the m collection of samples can be 1 or more different color samples, but is usually chosen so that the number of training samples m is larger than the number of sensor channels n. In one particular implementation, a processor or computer is configured to receive the measurement values comprising raw-data matrix S and store these values for further use. For example, a calibration module 512 configures a processor to access measurements made for each of the m samples and to store the resulting raw-data matrix S in a database for further use or access.

As shown in step 304, the same set of m samples is measured using a master or control color measurement device. In one or more implementations, the master or control measurement device includes a color or light sensor that has more spectral channels than the spectrum recovery device of FIG. 1. For example, where the spectrum recovery device of FIG. 1 has less than 10 spectral measurement channels, the master color measurement device has 31 spectral measurement channels. As shown in step 304, measurement values obtained from the control or master measurement device are obtained. For instance, the output generated when a control device is used to measure m samples is stored to a remote database 108 for retrieval. A processor configured by one or more submodules of the calibration module 512 is operative to access the measurements obtained by the control device and generate a control measurement vector R according to:

$$R = \begin{pmatrix} r_{1,1} & \cdots & r_{1,p} \\ \vdots & \ddots & \vdots \\ r_{m,1} & \cdots & r_{m,p} \end{pmatrix}, \quad (4)$$

where the value $r_{m,p}$ is the reflectance of the $m^{th}$ sample at $p^{th}$ wavelength measured by the master instrument. In one or more implementations, the control or master instrument used to obtain matrix R is a SCI color measurement device.

Using the measurement matrices obtained in steps 302 and 304, a transformation matrix M can be obtained using a pseudoinverse function according to the following:

$$M=pinv(S)*R$$

However, using the value for raw data matrix S directly does not provide the compensation for the gloss difference between the master instrument (such as a SCI geometry instrument) and the spectrum recovery device.

As shown in step 306, in order to compensate for the gloss difference between geometries, the raw data matrix S is adjusted by adding specular values G to the raw measurement values. In one implementation, a processor is configured by a specular adjustment module 514 to produce a specular adjusted measurement of the raw data matrix S values according to:

$$S_g = S + G = \begin{pmatrix} S_{1,1} + g_1 & \cdots & S_{1,n} + g_n & 1 \\ \vdots & \ddots & \vdots & \vdots \\ S_{m,1} + g_1 & \cdots & S_{m,n} + g_n & 1 \end{pmatrix}, \quad (6)$$

where G is a gloss compensation matrix, and its components $g_1 \sim g_n$ are the gloss compensation for channels 1~n. It should be appreciated that for different sample 1~m, the compensation $g_1 \sim g_n$ are the same, where the set of calibration color samples have similar surface gloss properties. Alternatively, if the set of calibration color samples have different gloss values, Eq. 6 can be extended to:

$$S_g = S + G = \begin{pmatrix} S_{1,1} + g_{1,1} & \cdots & S_{1,n} + g_{1,n} & 1 \\ \vdots & \ddots & \vdots & \vdots \\ S_{m,1} + g_{m,1} & \cdots & S_{m,n} + g_{m,n} & 1 \end{pmatrix}, \quad (7)$$

Where the constant value 1 is provided in the last column of the matrix $S_g$.

Once the value for the adjusted raw data matrix $S_g$ is derived according to Eq. 6 or 7, the transformation matrix M can be calculated according to:

$$M_{g=pinv}(S_g)*R \quad (8)$$

In turn, the matrix derived from Eq. 8 can then be output, as shown in step 308, for use in calculating $R_{convert}$.

In one particular implementation, the calibrations factors $g_1$-$g_n$ used to generate adjusted raw data matrix $S_g$ are accessed from a local or remote data storage device, such as database 108. For example, as shown in step 305, a processor configured by the access module 506 retrieves the values for G from a data repository.

Figure 4:
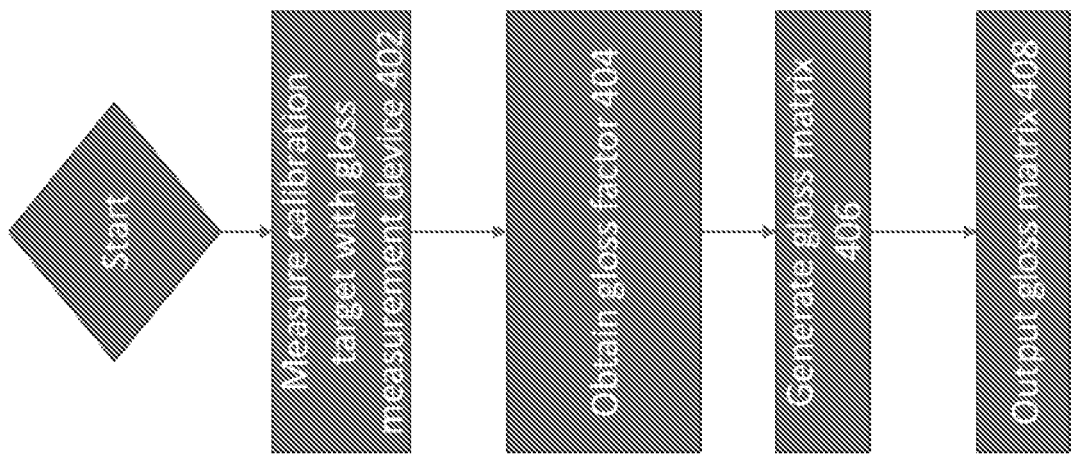
FIG. 4 is a flow diagram detailing particular steps in an improved spectrum recovery process.
Figure 5:
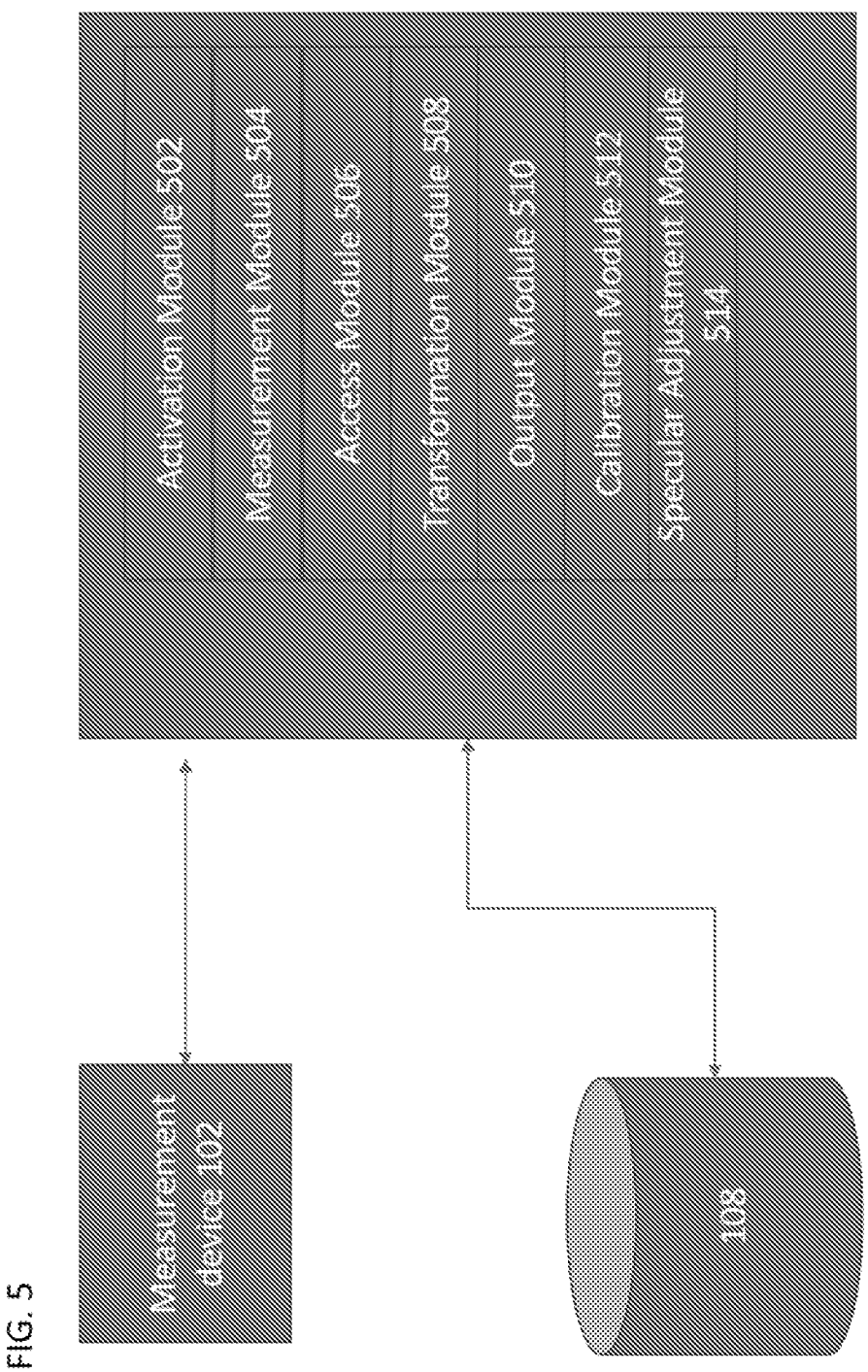
FIG. 5 is a component diagram detailing particular modules used to carry out the steps of an improved spectrum recovery process.

In one or more further implementations, the values for $g_1$-$g_n$ can be obtained from direct measurements of calibration targets. For example, as shown in FIG. 4, the measurement values obtained for $g_1$-$g_n$ are obtained by identifying a gloss related coefficient and using that value to transform measurements of a standard calibration target. As shown in step 402, measurements of the raw counts generated by the spectrum recovery device of FIG. 1 are obtained when a white diffuser or white calibration tile is measured. For example, a processor of the spectrum recovery device is configured by the measurement module 504 to obtain measurements of a while calibration tile. The obtained measurement in step 402 are then used to generate a transformed gloss matrix. By way of example, a processor is configured by one or more transformation modules (such as transformation module 508) to convert the measurement values to gloss corrected measurement values according to the following:

$$(g_1, g_2, \ldots, g_n) = (w_1, w_2, \ldots, w_n)*g_0, \quad (9)$$

where $w_n$ is the raw counts of $n^{th}$ channel when measuring a white diffuser or a white calibration tile, and $g_0$ is a gloss related coefficient. In one or more implementations, the gloss related coefficient is a value between −0.04 and 0.04.

In one or more implementations, as shown in step 404, the gloss related coefficient is accessed from one or more local or remote memory stores accessible to the processor implementing the transformation process to obtain $g_1$-$g_n$. Thus, once $g_1$-$g_n$ have been obtained, the adjusted raw data matrix $S_g$ can be obtained, as in step 406, which in turn is output (as shown in step 408) to the calibration process at step 306. Once the calibration process has been performed, the resulting transformation matrix M to be derived and used to evaluate new measurements made by the spectrum recovery device of FIG. 1. Once obtained, the derived matrix $R_{convert}$ can then be obtained, which represents a spectrum, derived from the spectrum recovery device, that can match a master instrument with a different geometry, such as a SCI geometry.

It should be further appreciated that the last row of the transformation matrix M derived from Eq. 8 is directly related to the gloss compensation. It has been unexpectedly determined that the gloss compensation with different values for $g_0$ in Eq. 9 only impacts the last row of transformation matrix M. Thus, in one or more implementations a suitably configured processor includes a plurality of potential values for the last row in transformation matrix M. In response to one or more input signals, the processor is configured to implement gloss compensation by altering the last-row values in the transformation matrix M using one or more of the potential values.

In one arrangement, the input signal received by the processor is in the form of a user generated signal, or a signal that is generated in response to user input. Here, the input signal is received by a processor configured by one or more submodules of the measurement module 504. In response to the received signal, the configured processor selects one of the pre-determined gloss compensation values and adjusts the last row of the transformation matrix M.

In another implementation, the input signal is based on a calculation made by the processor configured by one or more submodules of the measurement module 504.

In one or more implementations, the gloss compensation values for a particular measurement of a sample can be achieved by changing the values of the last row in transformation matrix M. For example, if the material type of a sample is known, the processor can be instructed to select a corresponding gloss compensation value from a look-up table or database. In one or more implementations, one or more processors are configured by code executing therein to derive a value for M using at least the gloss coefficient.

The gloss compensation value is then applied to the last row in transformation matrix M to obtain a gloss value modified matrix. The gloss value modified matrix is then applied to the vector of measurement raw signals as shown in Eq. 2 to obtain the recovered vector for the sample.

Figure 9:
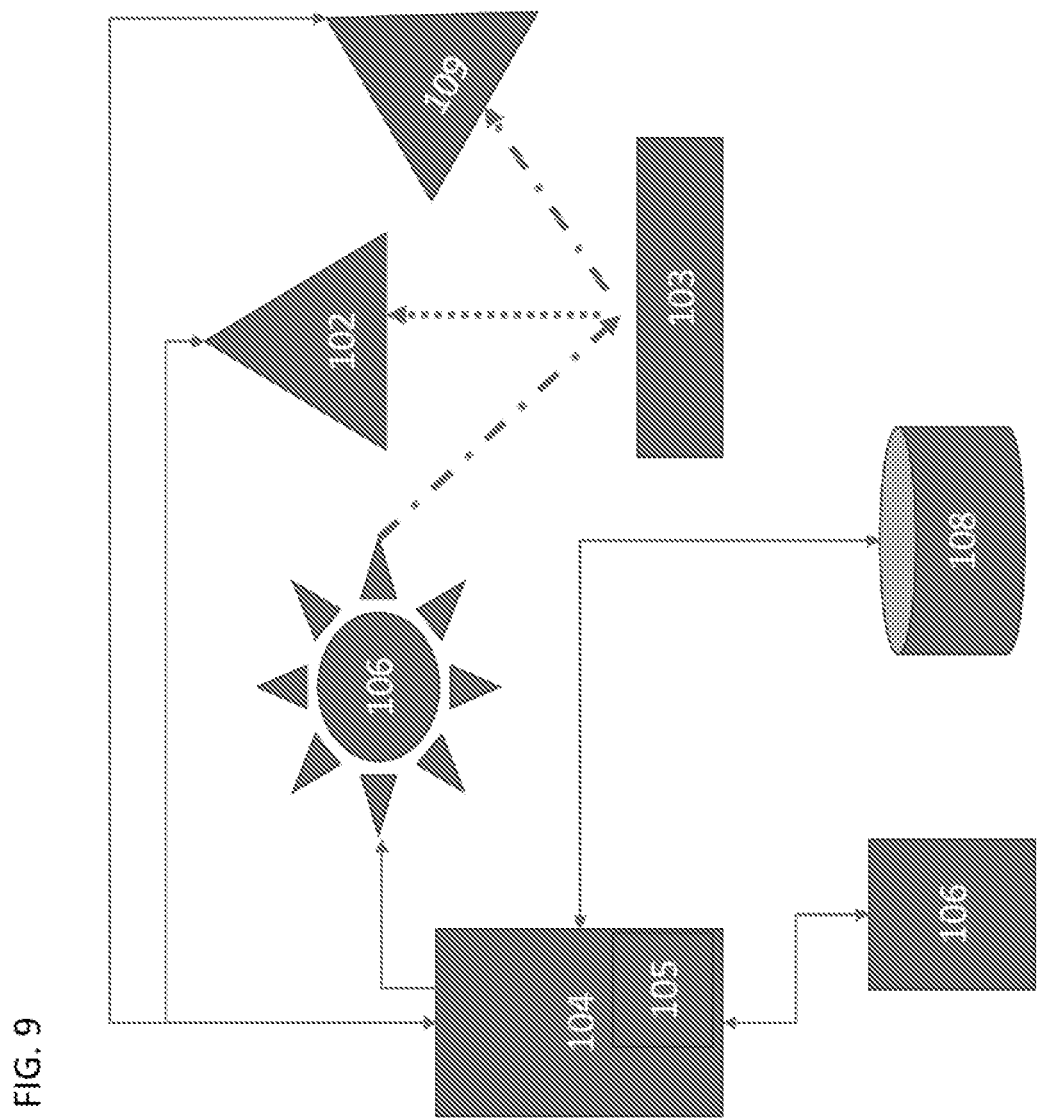
FIG. 9 is a schematic illustration detailing particular elements of the described spectrum recovery apparatus.

In another implementation shown in FIG. 9, the spectrum recovery device described herein includes a gloss meter 109. In a particular implementation, the measurement step 204 includes obtaining a separate measurement of the gloss properties of a sample 103. For example, where a gloss meter is integrated into the spectrum recovery instrument, the processor 104 is configured by the measurement module to receive one or more data values corresponding to the gloss properties of the sample 103. The measured gloss value can then be used to set the gloss compensation factor $g_0$ in equation 9. In response, the resulting transformation matrix will be updated with the real-time measurement of the gloss properties of the sample 103 and accordingly to obtain a proper spectrum output.

In an alternative implementation where the spectrum recovery device lacks an integrated gloss meter, the user interface device 106 is configured to transmit a user provided gloss value for the sample under analysis. In this implementation, the specular adjustment module configures the processor to receive from a user input a gloss value and determine adjustment matrix G using the supplied values. In one or more implementations, the user interface 106 provides a user with a pre-set selection of potential gloss values to select. In a further implementation, the pre-set gloss values are provided as surface property characteristics (e.g. glossy, semi-glossy, mat, etc.), or numerical values. The user's selection or submission of this gloss information can be collected and stored in a local or remote data storage device, such as database 108. As such, step 406, in one arrangement, includes accessing this user provided information as in connection with the determination of the gloss matrix (as in step 406). For example, the specular adjustment module 514 configures a processor to provide the value for $g_0$ provided by the user. From there, the process of obtaining the transformation matrix $M_g$ proceeds according to steps 208-210. Alternatively, the processor of the improved spectrum recovery device can select one of the many pre-stored transformation matrices according to the sample gloss information based on user put and output the proper spectrum.

In yet another implementation, the color measuring device can be pre-adjusted in the factory and allow the user to measure various samples with similar gloss properties the device is targeted for.

Although one specific implementation was used as an example as shown above, an ordinary person in this field should understand that there are different ways to implement the processes described herein. For example, one can use a white calibration tile to normalize the raw counts in measurement steps 204, 302 and 402, and then use the normalized raw counts as the raw counts in the equations 1~8. By doing so, one can compensate the system drift caused by reasons such as the aging of light source, etc. For another example, one can add a reference channel in the system and use the reference channel raw counts to normalize the sample channel raw counts obtained in steps 204, 302 and 402, and then use the normalized raw counts in the equations 1~8. By doing so, one can compensate the system variation caused by light intensity fluctuation, etc.

As shown in FIG. 6 is the relation of color Y-value and surface gloss when measuring a group of samples of the same color but different gloss using different geometry instruments. Here, the SCI results stay similar for samples with different gloss, however, the other geometries, particularly 45/0, are sensitive to the surface gloss of the sample measured. Given these differences, it's hard to compare or match the measurement result obtained from different instruments.

Figure 7:
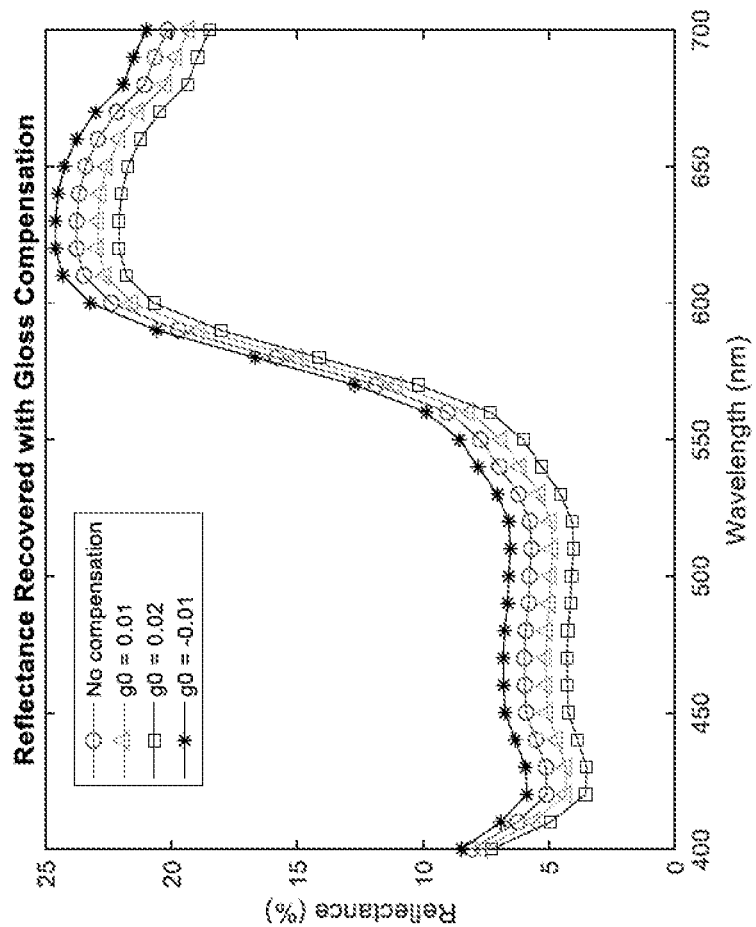
FIG. 7 is a plot detailing additional data measurements in connection with the described improved spectrum recovery process.

However, using the improved processes and apparatus described herein, the reflectance spectrum of a color sample measured with the same 45/0 measurement geometry can be adjusted to obtain a more accurate spectrum of an object to match the result of the same object obtained from other measurement geometries. As shown in FIG. 7, by using various gloss compensation coefficients (obtained in steps 402-408) the output of the spectrum recovery instrument can be adjusted accordingly. This can be used to compensate the color difference caused by different geometries.

Figure 8:
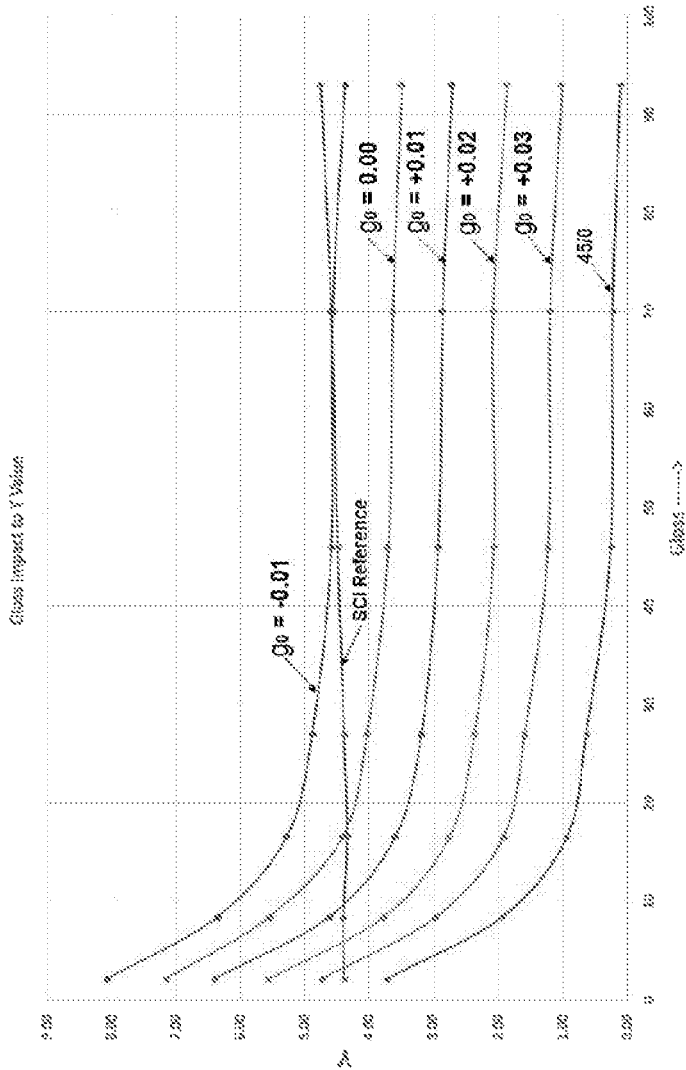
FIG. 8 is a plot detailing data measurement in connection with the described improved spectrum recovery process.

As shown in FIG. 8, a plot shows the result of color Y-value and gloss relation when measuring a series of samples of the same color but different surface gloss with an SCI device and a 45/0 device compensated with various gloss coefficients. Among the curves, the "SCI Reference" curve is measured with a reference SCI instrument, the rest are measured with the same 45/0 device. Particularly, the "45/0" curve is with the device trained with standard 45/0 reference, the "g0=x" curve is with the same device trained with SCI reference and compensated with gloss coefficient $g_0$=x.

As shown in FIG. 8 plot, in general a 45/0 instrument doesn't match with an SCI instrument when measuring colors. Even trained with SCI reference, the two only match when measuring samples similar to the training samples, in this case Gloss≈16 as the two curves "SCI Reference" and "g0=0.00" cross. When measuring sample with Gloss≈5, for example, the device needs to be compensated by "g0=+ 0.02" so the curve can cross the "SCI Reference" at Gloss≈5.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

The invention claimed is:

1. A spectrum recovery apparatus configured to measure the color of a sample comprising:
   at least one light source configured to illuminate the sample;
   at least one light sensor configured output a signal that includes plurality of channels of data in response to light emitted by light source and incident upon the sample being received by at least a portion of the light sensor; and
   a processor operative to:
      receive the signal,
      calculate an adjusted spectrum for the sample derived from the signal and at least one calibration factor, where the adjusted spectrum is a vector that has a larger dimension than the plurality of channels of data,
      output the adjusted spectrum of the sample to at least one output device that is configured to receive data from the processor.

2. The spectrum recovery apparatus of claim 1, wherein the processor is configured by one or more modules operating as code in the memory thereof to calculate the adjusted spectrum $R_{convert}$ according to:
   $(v_1, v_2, \ldots, v_{31})$, represent the recovered reflectance of the sample at a given wavelength and
   where $T=(t_1, t_2, \ldots, t_n, 1)$ and where $t_n$ is the sensor measurement of the sample on the nth channel obtained from the light sensor and M is the calibration factor.

3. The spectrum apparatus of claim 2, wherein M is a matrix.

4. The spectrum recovery apparatus of claim 2, further comprising a gloss measurement device configured to send a signal to the processor that corresponds to a measurement of the gloss properties of the sample.

5. The spectrum recovery apparatus of claim 4, where in the processor is configured to calculate a gloss coefficient using at least the signal from the gloss measurement device.

6. The spectrum recovery apparatus of claim 5, wherein the processor is configured to derive a value for M using at least the gloss coefficient.

7. The spectrum recovery apparatus of claim 1, wherein the orientation of the at least one light source and the at least one light sensor is in a measurement configuration having 45-degree incident angle and 0-degree reflection angle (45/0) measurement geometry).

8. The spectrum recovery apparatus of claim 7, wherein the at least one calibration factor is derived, in part, from measurements made using a control color measurement device having a different measurement geometry than 45/0.

9. The spectrum recovery apparatus of claim 8, wherein the control color measurement device is a specular component included (SCI) orientation measurement device.

10. The spectrum recovery apparatus of claim 8, wherein M is calculated according to:

$$M_g = \text{pinv}(S_g) * R$$

Where pinv is a pseudoinverse, Sg is a measurement matrix comprising measurements of each of a plurality of color samples m using the spectrum recovery apparatus and R is a measurement matrix comprising measurement of each of the plurality of color samples m using a color measurement device having a different measurement geometry than 45/0.

11. The spectrum recovery apparatus of claim 10, wherein R is calculated according to:

$$R = \begin{pmatrix} r_{1,1} & \cdots & r_{1,t} \\ \vdots & \ddots & \vdots \\ r_{m,1} & \cdots & r_{m,t} \end{pmatrix}$$

where the value $r_{m,t}$ is the reflectance of the $m^{th}$ sample at $t^{th}$ wavelength measured by the master instrument.

12. The spectrum recovery apparatus of claim 10, wherein Sg is calculated according to:

$$S_g = S + G = \begin{pmatrix} S_{1,1}+g_1 & \cdots & S_{1,n}+g_n & 1 \\ \vdots & \ddots & \vdots & \vdots \\ S_{m,1}+g_1 & \cdots & S_{m,n}+g_n & 1 \end{pmatrix},$$

where $S_{m,n}$ is the sensor measurements of the $m^{th}$ sample on the nth channel and where G is a gloss compensation matrix, and its components $g_1 \sim g_n$ are the gloss compensation values for channels 1~n, It should be appreciated that for different sample 1~m, the compensation $g_1 \sim g_n$ are the same.

13. The spectrum recovery apparatus of claim 12, wherein G is calculated according to the following:

$$(g_1, g_2, \ldots, g_n) = (w_1, w_2, \ldots, w_n) * g_0,$$

where $w_n$ is the raw counts of nth channel when measuring a white calibration target, and $g_0$ is a gloss coefficient.

14. A method to recover the spectrum of a sample, the method comprising:
   illuminating, using at least one light source, the sample;
   outputting, using at least one light sensor, a signal having a plurality of data channels in response to light that has been emitted by the at least one light source and incident off of the sample striking a light sensing element of the light sensor, to a least one processor;

calculating, using the at least one processor, an adjusted spectrum for the sample derived from the signal and at least one calibration factor where the adjusted spectrum is a vector that has a larger dimension than the plurality of data channels, outputting, using the at least one processor, the adjusted spectrum of the sample to at least one output device that is configured to receive data from the processor.

15. The spectrum recovery process of claim 14, wherein the processor is configured by one or more modules operating as code in the memory thereof to calculate the adjusted spectrum $R_{convert}$ according to:

where $T=(t_1, t_2, \ldots, t_n, 1)$ and where in is the sensor measurement of the sample on the nth channel obtained from the light sensor and M is the calibration factor.

16. The spectrum recovery process of claim 14, wherein the orientation of the at least one light source and the at least one light sensor is in a measurement configuration having 45-degree incident angle and 0-degree reflection angle (45/0) measurement geometry).

17. The spectrum recovery process of claim 16, further deriving, using the at least one processor, the calibration factor from measurements made using a control color measurement device having a different measurement geometry than 45/0.

18. The spectrum recovery process of claim 17, further comprising calculating, using the at least one processor, calibration factor M according to:

$$M_g = \text{pinv}(S_g) * R$$

where pinv is a pseudoinverse, Sg is a measurement matrix comprising measurements of each of a plurality of color samples m using the spectrum recovery apparatus and R is a measurement matrix comprising measurement of each of the plurality of color samples m using a color measurement device having a different measurement geometry than 45/0.

* * * * *